(12) United States Patent
Kisley et al.

(10) Patent No.: US 7,707,374 B2
(45) Date of Patent: *Apr. 27, 2010

(54) INCREMENTAL DATA STORAGE METHOD, APPARATUS, INTERFACE, AND SYSTEM

(75) Inventors: Richard V. Kisley, Charlotte, NC (US); John Michael Lake, Cary, NC (US); Durga Devi Mannaru, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 479 days.

This patent is subject to a terminal disclaimer.

(21) Appl. No.: 11/619,151

(22) Filed: Jan. 2, 2007

(65) Prior Publication Data

US 2007/0156794 A1  Jul. 5, 2007

Related U.S. Application Data

(63) Continuation-in-part of application No. 10/692,100, filed on Oct. 22, 2003, now Pat. No. 7,171,538.

(51) Int. Cl.
*G06F 12/16* (2006.01)
(52) U.S. Cl. .............. 711/162; 711/173; 711/E12.103
(58) Field of Classification Search .................. 711/161
See application file for complete search history.

(56) References Cited

U.S. PATENT DOCUMENTS

| 5,403,639 | A | | 4/1995 | Belsan et al. ............... 395/600 |
| 5,586,248 | A | | 12/1996 | Alexander et al. ........ 395/182.2 |
| 5,835,953 | A | * | 11/1998 | Ohran ........................ 711/162 |
| 6,021,408 | A | | 2/2000 | Ledain et al. ................ 707/8 |
| 6,061,770 | A | * | 5/2000 | Franklin .................... 711/162 |
| 6,163,856 | A | | 12/2000 | Dion et al. ..................... 714/4 |
| 6,185,663 | B1 | * | 2/2001 | Burke ........................ 711/156 |
| 6,223,269 | B1 | | 4/2001 | Blumenau ................... 711/202 |
| 6,240,527 | B1 | | 5/2001 | Schneider et al. ............. 714/21 |
| 6,366,987 | B1 | | 4/2002 | Tzelnic et al. .............. 711/162 |
| 6,374,267 | B1 | | 4/2002 | Tam .......................... 707/204 |
| 6,397,307 | B2 | * | 5/2002 | Ohran ........................ 711/161 |

(Continued)

OTHER PUBLICATIONS

Santry, Douglas S.; Michael J. Feeley; Norman C. Hutchinson; Alistair C. Veitch; Ross W. Carton; and Jacob Ofir. "Deciding when to forget in the Elephant filesystem." SOSP-17. 1999. ACM.*

(Continued)

*Primary Examiner*—Reginald G Bragdon
*Assistant Examiner*—Nathan Sadler
(74) *Attorney, Agent, or Firm*—Kunzler Needham Massey & Thorpe

(57) ABSTRACT

An interface for managing incremental data storage includes a write function that appends an entry to an incremental log, a read function that retrieves a most recent log entry corresponding to a block address, and a snapshot function that automatically partitions the incremental log into an additional volume. The interface may also include a policy assignment function that associates specified policies with explicitly or implicitly specified resources, a read entry function that retrieves sequential entries from the incremental log, and a compact volume function. The provided functions and associated apparatus, method, and system, facilitate management of incremental data including snapshot, remote copy, data compaction, policy management, data restoration, and other operations on data storage devices and systems.

22 Claims, 6 Drawing Sheets

U.S. PATENT DOCUMENTS

| | | | | |
|---|---|---|---|---|
| 6,397,308 | B1 | 5/2002 | Ofek et al. | 711/162 |
| 6,442,706 | B1 | 8/2002 | Wahl et al. | 714/6 |
| 6,594,744 | B1* | 7/2003 | Humlicek et al. | 711/162 |
| 6,671,757 | B1 | 12/2003 | Multer et al. | 710/100 |
| 6,732,125 | B1* | 5/2004 | Autrey et al. | 707/204 |
| 6,771,843 | B1* | 8/2004 | Huber et al. | 382/305 |
| 6,799,258 | B1* | 9/2004 | Linde | 711/162 |
| 6,826,666 | B2 | 11/2004 | Berkowitz et al. | 711/162 |
| 7,171,538 | B2* | 1/2007 | Kisley et al. | 711/173 |
| 7,237,080 | B2* | 6/2007 | Green et al. | 711/162 |
| 7,240,172 | B2* | 7/2007 | Chong et al. | 711/162 |
| 7,430,568 | B1* | 9/2008 | DeKoning et al. | 707/200 |
| 2003/0028736 | A1* | 2/2003 | Berkowitz et al. | 711/162 |
| 2004/0186900 | A1 | 9/2004 | Nakano et al. | 709/213 |
| 2004/0260900 | A1* | 12/2004 | Burton et al. | 711/162 |
| 2004/0268067 | A1 | 12/2004 | Yamagami | 711/159 |
| 2005/0015641 | A1* | 1/2005 | Alur et al. | 714/2 |

OTHER PUBLICATIONS

Strunk, John D.; Garth R. Goodson; Adam G. Pennington; Craig A.N. Soules; and Gregory R. Ganger. "Intrusion Detection, Diagnosis, and Recovery with Self-Securing Storage." May 2002. CMU-CS-02-140. Carnegie Mellon University.*

John K. Ousterhout and Mendel Rosenblum, "The Design and Implementation of a Log-Structured File System", Jul. 24, 1991.

Mario Apicella, "Next-Generation Data Protection" http://www.infoworld.com/article/03/05/23/21TCdiskbacks_1.html ,May 23, 2003.

Andrew S. Tanenbaum, "Structured Computer Organization" Prentice-Hall, Inc., $2^{nd}$ Edition, p. 11.

* cited by examiner

500

| | |
|---|---|
| 510 | setPolicy |
| 520 | blockRead |
| 530 | blockWrite |
| 540 | snapshotCreate |
| 550 | snapshotDelete |
| 560 | snapshotReadEntry |
| 570 | volumeCompact |

Fig. 5

INCREMENTAL DATA STORAGE METHOD, APPARATUS, INTERFACE, AND SYSTEM

CROSS-REFERENCES TO RELATED APPLICATIONS

This application is a continuation-in-part of and claims priority to U.S. Provisional patent application Ser. No. 10/692,100, now U.S. Pat. No. 7,151,538, entitled "INCREMENTAL DATA STORAGE METHOD, APPARATUS, INTERFACE, AND SYSTEM" and filed on Oct. 22, 2003 for Richard V. Kisley, John M. Lake, and Durga D. Mannaru, which is incorporated herein by reference.

BACKGROUND OF THE INVENTION

1. Field of the Invention

The invention relates to interfaces, methods, apparatus, and systems for storing data. Specifically, the invention relates to interfaces, methods, apparatus, and systems for managing incremental data storage.

2. Description of the Related Art

Data storage devices and systems are subject to equipment failures, software bugs, operational errors, and disasters that prevent immediate or long term access to valuable data. Additionally, data storage systems often support environments and applications that require storage reliability and availability that is greater than what is inherently provided by individual storage devices. As a result, many techniques and strategies have been applied to data storage devices and systems in order to increase the reliability and availability of data access. Some of those techniques include storage redundancy, data archiving, and remote copy techniques.

Storage redundancy techniques improve reliability by storing redundant images on multiple devices. Data mirroring, in which data is written to two or more devices in parallel, is perhaps the simplest redundancy technique. Although expensive in terms of storage usage, data mirroring facilitates increased performance in that read operations may be distributed to each parallel device to increase storage throughput. However, storage redundancy techniques, although useful, do not address the need for access to previous copies of data files or images within a data storage system.

Data archiving techniques were developed in response to the need to access previous copies of data files or images within data storage systems. With data archiving techniques, data files or images are copied to backup devices and maintained for subsequent use. Backup devices typically comprise slower media that must be carefully managed to successfully restore a file or image to a previous state. To reduce the bandwidth associated with archiving data, incremental techniques are often applied in which only the changes to a file or image are stored on the archive media. Incremental techniques while useful, may increase the complexity of restoring data files or images within data storage systems.

Remote copy techniques are a particular form of data archiving in which data is copied to a remote site either via physical media or transmission links. The availability of a remote copy facilitates recovery operations in the event of a local disaster such as a fire or flood. However, providing complete and constant data availability requires transmission of each write operation to the remote site resulting in high bandwidth requirements for the transmission link.

The aforementioned techniques and strategies are often implemented as host-based solutions requiring considerable planning, administration, and coordination for reliable deployment. Typically, multiple techniques and strategies must be deployed and managed to fit the needs of a particular installation. Such solutions are typically expensive to implement, reduce system performance, and may not provide adequate data availability and reliability.

Consequently, a need for an integrated approach to increasing data availability and reliability that is inexpensive to deploy, easy to manage, and transparent to system performance. In particular, what is needed are interfaces, methods, apparatus, and systems for providing and managing incremental data storage in a manner that supports policy management, data redundancy, and compacted remote copy operations.

SUMMARY OF THE INVENTION

The various elements of the present invention have been developed in response to the present state of the art, and in particular, in response to the problems and needs in the art that have not yet been fully solved by currently available data storage means and methods. Accordingly, the present invention provides an improved interface, method, apparatus, and system for storing and managing incremental copies of volume images.

In one aspect of the present invention, an interface for managing incremental data storage is provided and includes a write function configured to append an entry to an incremental log, a read function configured to retrieve a most recent log entry corresponding to a block address, and a snapshot function configured to automatically partition the incremental log into a first and second volume.

The interface may also include a delete volume function configured to release a snapshot volume, a policy assignment function configured to assign a policy to an incremental log, a read entry function configured to retrieve a sequential entry from the incremental log, and a compact volume function configured to compact a snapshot volume.

The interface for managing incremental data storage provides a rich set of functions that facilitate automated snapshot management, compacted or non-compacted remote copy operations, policies for storage management, and advanced data recovery. Snapshot images may be automatically associated with a volume identifier such as a logical unit number (LUN) in order to reduce the complexity of managing snapshot data.

In another aspect of the present invention, a method for managing incremental data storage includes appending data to an incremental log, automatically partitioning the incremental log in response to a snapshot operation, and assigning a volume identifier to a newly formed partition as directed by a storage management policy.

The aforementioned method may also include copying selected log entries to a tertiary volume, retrieving a most recent log entry corresponding to a block address, retrieving a most recent log entry corresponding to a specified snapshot volume and block address, and automatically compacting a snapshot partition. In one embodiment, each log entry contains a pointer to a subsequent entry and in-place compaction of a snapshot partition is performed by placing redundant log entries (i.e. overwritten entries) within a free list. In-place compaction substantially eliminates the copy operations normally associated with compaction.

The method for managing incremental data storage provides an integrated approach to managing incremental storage that supports a wide variety of policies such as automated volume creation and automated compaction of incremental partitions into a baseline image in response to snapshot operations. The provided functionality greatly reduces the complexity of managing incremental storage and facilitates increased data storage reliability and availability.

In another aspect of the present invention, an apparatus for incremental data storage includes a baseline volume containing a baseline image, an incremental log partitioned into one or more snapshot volumes, and a partition module configured to automatically partition the incremental log into an additional snapshot volume in response to a snapshot operation.

In one embodiment, the partition module is also configured to assign a volume identifier to a newly formed partition as directed by a storage management policy.

In addition to the aforementioned elements, the apparatus for incremental data storage may also include a copy module configured to copy selected entries from the incremental log to a tertiary volume, a read module configured to retrieve a most recent log entry corresponding to a specified snapshot and block address, and a compaction module configured to automatically compact a snapshot partition to the baseline volume. In one embodiment, the compaction module is configured to conduct in-place compaction. The apparatus for incremental data storage provides incremental data storage and supports transparent storage management within a data processing system.

The various aspects and elements of the present invention are combined into a system for redundant incremental data storage. In one embodiment, the system for redundant incremental data storage includes a primary storage device configured to store data, a secondary storage device configured to store data within a baseline volume and an incremental log, the incremental log comprising at least one snapshot volume; a controller configured to store and access data on the primary and secondary storage device, and a snapshot management module configured to automatically partition the incremental log into an additional snapshot volume in response to a snapshot operation. In one embodiment, the primary storage device comprises a plurality of redundantly arranged devices and the secondary storage device provides an additional level of data redundancy. The system for redundant incremental data storage may also include a host configured to access data via the controller.

The various elements and aspects of the present invention provide highly available and reliable data storage to a data processing system or the like. These and other features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5 is a text-based diagram depicting one embodiment of an incremental storage management interface of the present invention.

DETAILED DESCRIPTION OF THE INVENTION

Many of the functional units described in this specification have been labeled as modules, in order to more particularly emphasize their implementation independence. For example, modules may be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. For example, a module of executable code could be a single instruction, or many instructions, and may even be distributed over several different code segments, among different programs, and across several memory devices.

Modules may also be implemented in hardware as electronic circuits comprising custom VLSI circuitry, off-the-shelf semiconductors such as logic chips, transistors, or other discrete components. A module may also be implemented in programmable hardware devices such as field programmable gate arrays, programmable array logic, programmable logic devices or the like.

Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
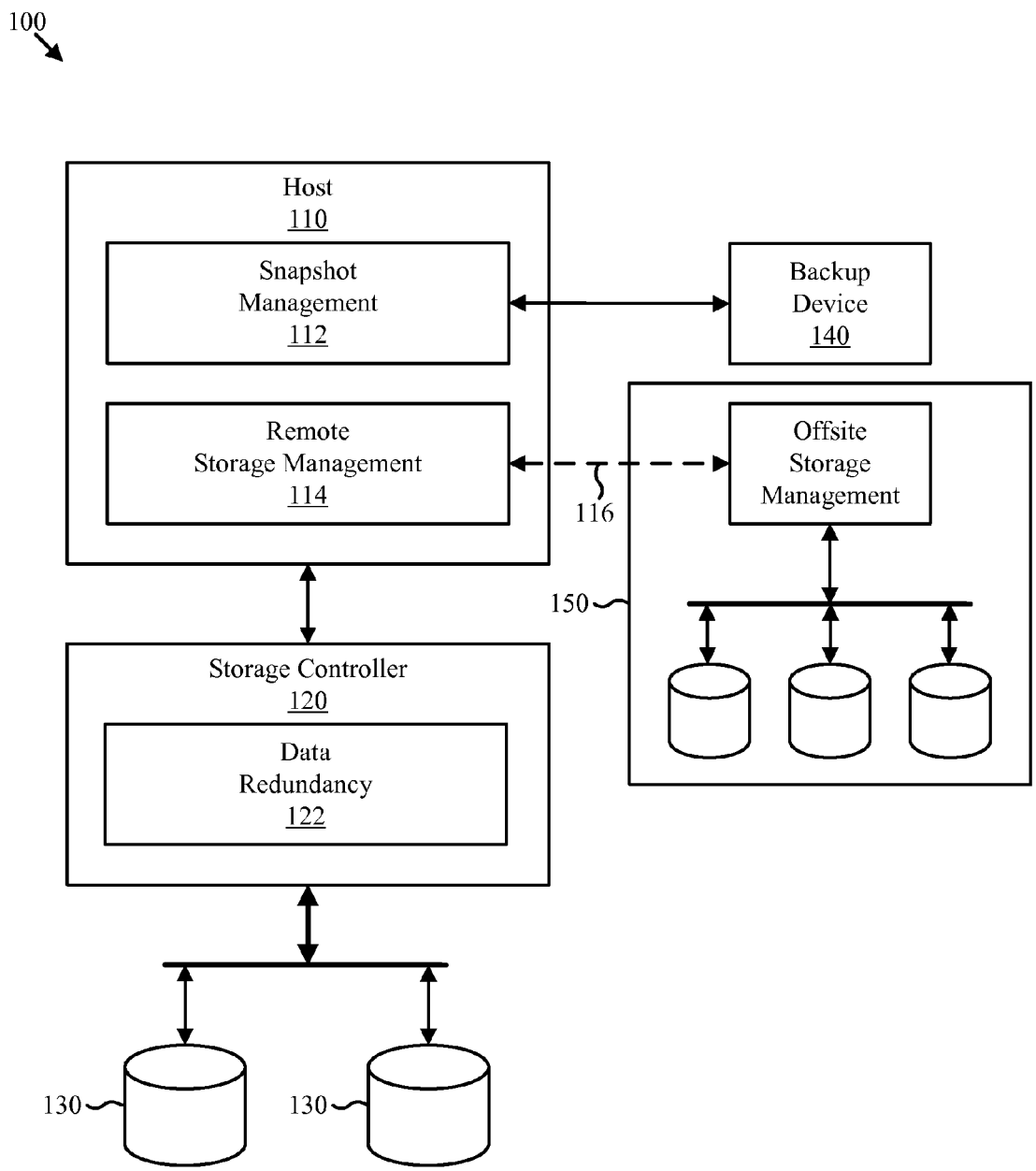
FIG. 1 is a block diagram illustrating one embodiment of a prior art data storage system.

Referring to FIG. 1, a representative prior art storage system 100 includes a host 110, one or more storage controllers 120 with redundant storage devices 130, one or more backup devices 140, and one or more data vaults 150. The various devices and modules depicted in FIG. 1 portray the complexity in providing data storage that is reliable and continuously available in light of equipment failures, operator errors, site disasters, and the like.

The depicted storage controller 120 includes a data redundancy module 122. The data redundancy module 122 generates and stores redundant images on the redundant storage devices 130. In certain configurations, the redundancy may be a completely redundant (i.e., mirrored) image storage stored on more than one device. In such a configuration, data access performance may be increased by alternating read operations between the redundant storage devices 130.

The depicted host 110 includes a snapshot management module 112 and a remote storage management module 114. The snapshot management module 112 captures volume images from the redundant storage devices 130 and streams those images to the backup device 140. The snapshot management module 112 may copy only those portions of an image which have changed since a previous backup.

In certain embodiments, portions of the snapshot management module may be contained within the storage controller 120 in order to increase system performance. Nevertheless, snapshot management and data redundancy are typically separate functions within a prior art storage system in contrast to the integrated nature of the present invention.

The depicted remote storage management module 114 transmits data on a data link 116 to the data vault 150. Typically, in order to maintain coherency between the image on the local storage volumes and the replicated volumes on the data vault 150, each write operation must be transmitted to the data vault 150 by the remote storage management module 114. However, due to the high bandwidth associated with write operations, large data buffers and high bandwidth transmission links are required in order to keep up with local write operations.

In certain embodiments, physical media may be transported to the data vault 150 in lieu of transmission on the data link 116. However, writing data to archival media increases the window of vulnerability in the event of failures and requires tedious synchronization and coordination activities when conducting recovery operations.

Figure 2:
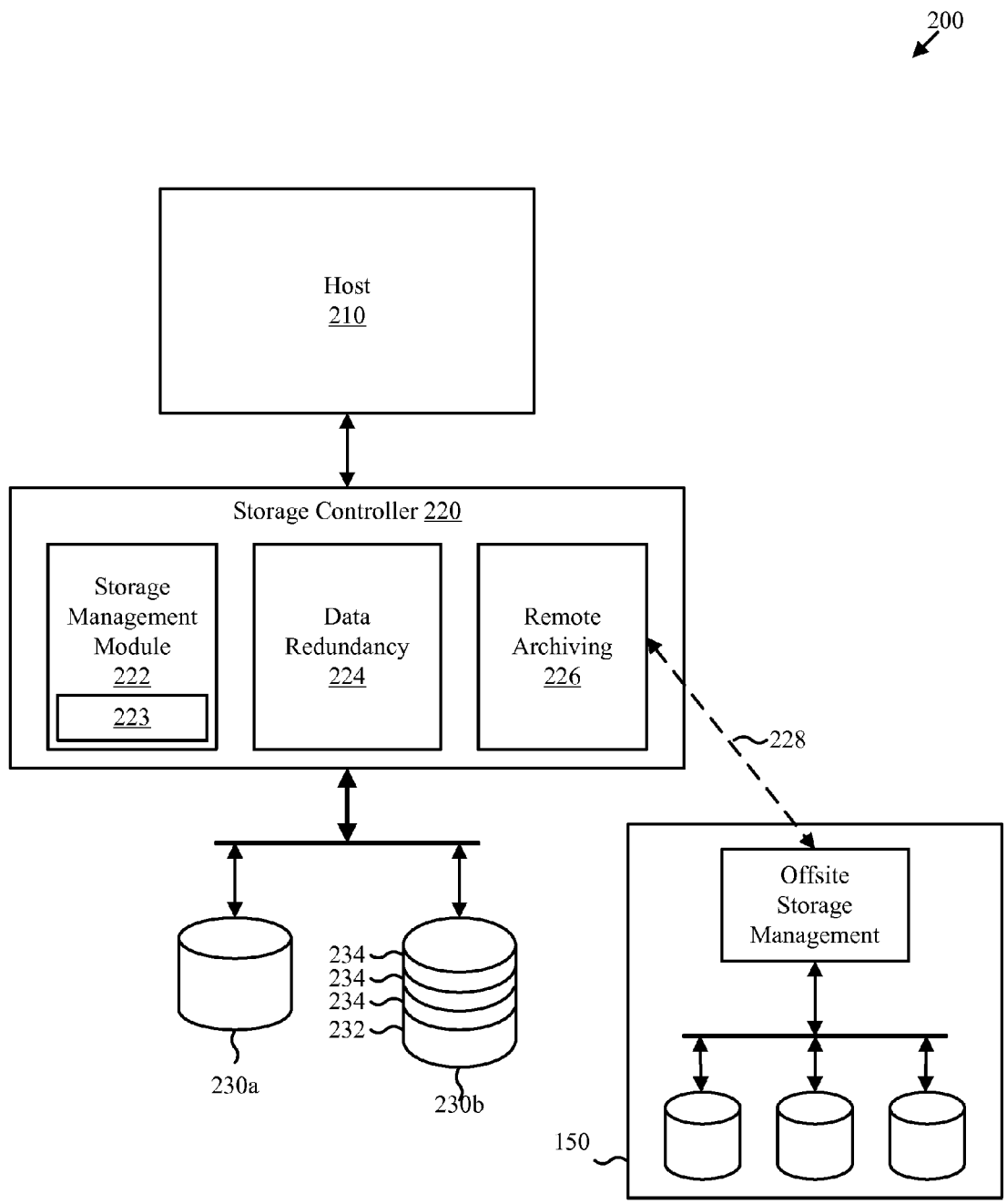
FIG. 2 is a block diagram illustrating one embodiment of a redundant incremental storage system of the present invention.

FIG. 2 is a block diagram illustrating one embodiment of a redundant incremental storage system 200 of the present invention. As depicted, the redundant incremental storage system includes a host 210, a storage controller 220, a set of redundant storage devices 230a-b (referred to herein collectively as "storage devices 230"), and the data vault 150. The redundant incremental storage system 200 provides an integrated approach to reliable high-availability data storage resulting in an inexpensive, easy to manage solution that is transparent to system performance.

As depicted, the storage controller 220 includes a storage management module 222, a data redundancy module 224, and a remote archiving module 226. Although the modules 222, 224, and 226 are depicted within a single storage controller 220, one of skill in the art will appreciate that the functionality provided by the modules 222, 224, and 226 may be distributed across a plurality of storage controllers and devices.

The storage management module 222 provides an integrated interface and related functionality for various storage management operations such as snapshot operations, compaction operations, archive operations, volume partitioning operations, and the like. The interface may conform to a storage management method and API described in conjunction with FIGS. 4 and 5.

In certain embodiments, the storage management module 222 supports the aforementioned operations via policies 223 such as temporal-based policies, status-based policies, and event-based policies. Through policies, snapshot operations, compaction operations, archive operations, and the like may be conducted at specific times, at specific intervals, in response to certain events, or conditions such as space availability on a volume.

The remote archiving module 226 may transmit compacted or non-compacted, incremental or non-incremental images of volumes on a data link 228 to the data vault 150. In certain embodiments, in place of the data vault 150, a completely redundant site (not shown) may be connected to the storage system 200 via the data link 228.

The redundant storage devices 230 include one or more incremental storage devices 230b and may include one or more non-incremental storage devices 230a. The incremental storage devices 230b comprise baseline volumes 232 and incremental volumes 234. In certain embodiments, the incremental volumes 234 correspond to partitions within an incremental log (not shown) and each partition contains entries for each write operation that occurred over a particular snapshot interval.

In one embodiment, the incremental log is automatically partitioned in response to a snapshot operation, thereby reducing the complexity of managing and accessing point-in-time copies of a particular volume. In certain embodiments, the baseline volumes 232 and the incremental volumes 234 function as secondary volumes to the volumes on the non-incremental storage devices and essentially form a RAID-1 redundancy configuration.

The non-incremental storage devices 230a and the incremental storage devices 230b may be arranged in various redundant configurations either separately or in combination. For example, the non-incremental storage devices 230a may be arranged in a RAID-5 configuration, while the incremental storage devices 230b may be arranged with little or no redundancy. In such an arrangement, the combination of the non-incremental storage devices 230a and the incremental storage devices 230b provide an additional level of redundancy beyond the separate RAID configurations of the non-incremental storage devices 230a and the incremental storage devices 230b.

Figure 3:
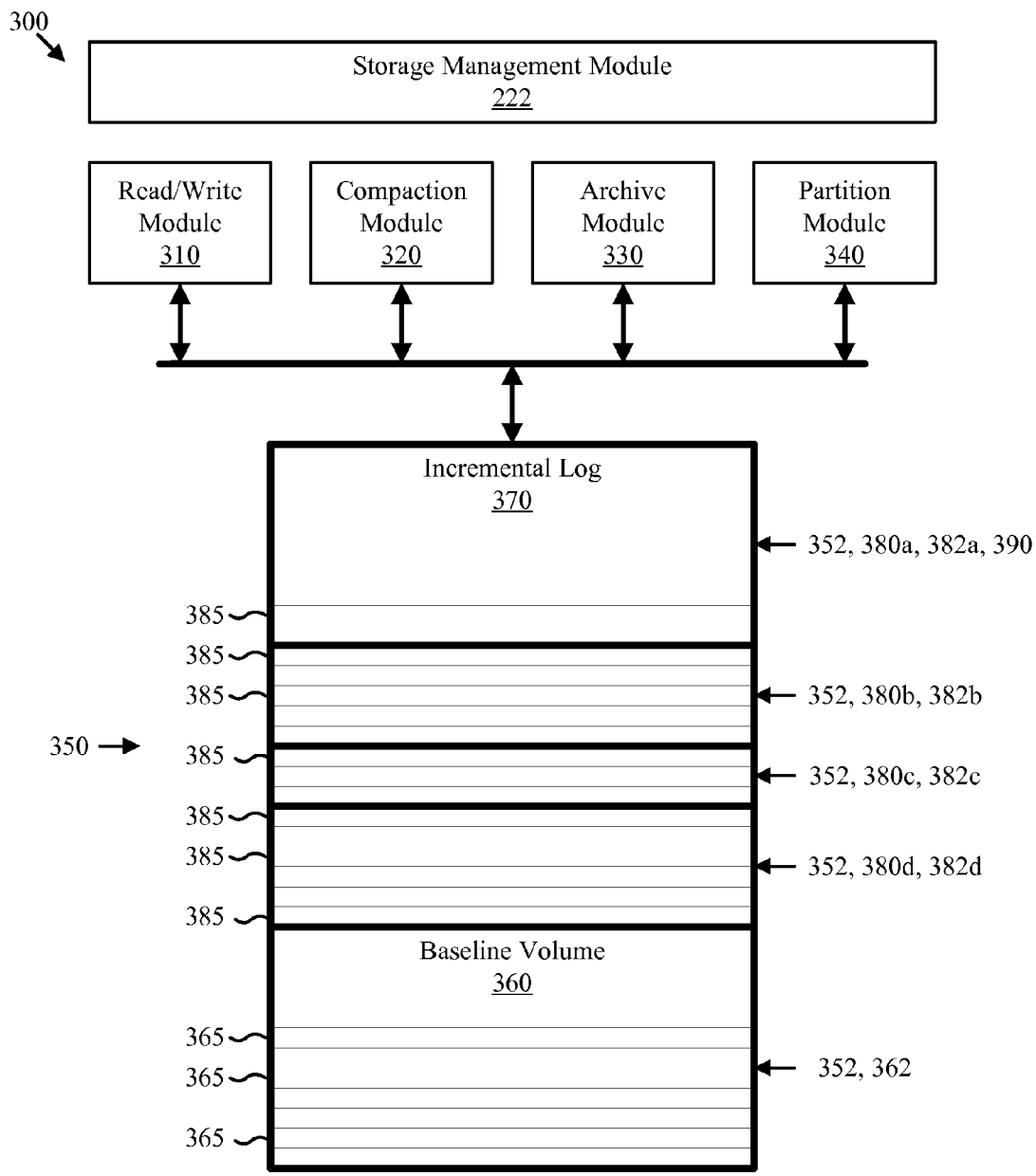
FIG. 3 is a block diagram illustrating one embodiment of an incremental storage appliance of the present invention.

FIG. 3 is a block diagram illustrating one embodiment of an incremental storage appliance 300 of the present invention. The depicted incremental storage appliance 300 illustrates one embodiment of certain elements of the redundant incremental storage system 200 in greater detail. In one embodiment, the depicted elements are integrated into a standalone storage subsystem. In another embodiment, the depicted elements correspond to volumes or partitions within the incremental storage devices 230b and modules residing on the storage controller 220, the host 210, or the like.

The incremental storage appliance 300 provides incremental storage in a manner that supports policy management, data redundancy, and compacted remote copy operations. The ability to support policy management, data redundancy, and compacted remote copy operations increases the utility and convenience of the storage appliance 300 over conventional storage means.

As depicted, the storage appliance 300 includes the storage management module 222, a read/write module 310, a compaction module 320, an archive module 330, a partition module 340, and a storage medium 350. The storage medium 350 may include a plurality of partitions 352 associated with volumes including baseline volumes 360 and incremental volumes 380a-d including current volumes 390. In the depicted embodiment, the partitions associated with the incremental volumes 380a-d are partitioned sequentially within the incremental log 370 as a result, for example, of a snapshot operation.

The volumes associated with the storage medium 350 may include a baseline volume 360 associated with a baseline partition 362, and several incremental volumes 380a-d including a current volume 390 associated with a set of incremental partitions 382a-d. As depicted, the partitions associated with the baseline volumes 360 and the incremental volumes 380a-d include, respectively, one or more baseline entries 365, and one or more incremental entries 385. The depicted baseline entries 365 and the incremental entries 385 correspond to data blocks provided by the read/write module 310 in conjunction with write operations and may contain a block address to facilitate recovery operations and the like.

The read/write module 310 supports read and write operations conducted on the storage medium 350. As depicted, write operations directed to the storage medium 350 are appended to the incremental log 370 and placed within a partition corresponding to the current volume 390 in sequential (i.e. time) order. An index table (not shown) or other appropriate mechanism, may be maintained within the read/write module 310 or elsewhere, indicating the placement of the most recent entry corresponding to a block address within a specified volume. The index may be updated with each write operation in order to reflect updates to a particular block.

In one embodiment, a block address and a volume identifier, such as a logical unit number (LUN), are provided when conducting read operations in order to indicate the block that is to be read within the specified volume. The volume identifier may specify a baseline volume or an incremental volume such as the current volume. In one embodiment, the aforementioned index, or the like, is used to retrieve the most recent entry on the storage medium 350 that corresponds to the specified volume and block. Given the incremental structure of the storage medium 350, the most recent entry may reside in a previous partition such as the baseline partition 362 rather than the partition associated with the specified volume.

The compaction module 320 provides compaction services within the storage appliance 300. Compaction may be conducted in conjunction with merging an incremental volume into the baseline volume 360, upon request, or in conjunction with remote copy operations, or the like. In one embodiment, compaction involves reusing space containing redundant entries in a manner that eliminates copy or move operations normally associated with compaction. In another embodiment, compaction involves transferring the most recent entry for each block address to the baseline volume, a backup device, a data vault, a redundant site, or the like.

The archive module 330 conducts archiving operations to a backup device or system such as a remote data vault, or the like. The archive module 330 may transmit compacted or non-compacted, incremental or non-incremental, time-ordered or block-ordered images, or combinations thereof, to the designated backup device or system. In one embodiment, the compacted images are generated by the compaction module 320.

The partition module 340 manages the incremental partitions 382a-d within the incremental log 370 and may manage the baseline partition 362. In one embodiment, the partition module 340 automatically partitions the incremental log 370 in response to a snapshot operation. The partition module 340 may also automatically assign a volume identifier to a newly formed partition in order to facilitate convenient access to specific snapshots.

The functionality of the compaction module 320, the archive module 330, and the partition module 340 may be managed and accessed by the storage management module 222 as described in conjunction with FIG. 2. Specifically the storage management module 222 may provide an API to access the functionality of the aforementioned modules and to set policies 223 governing their operation such as temporal-based policies, status-based policies, and event-based policies.

Figure 4:
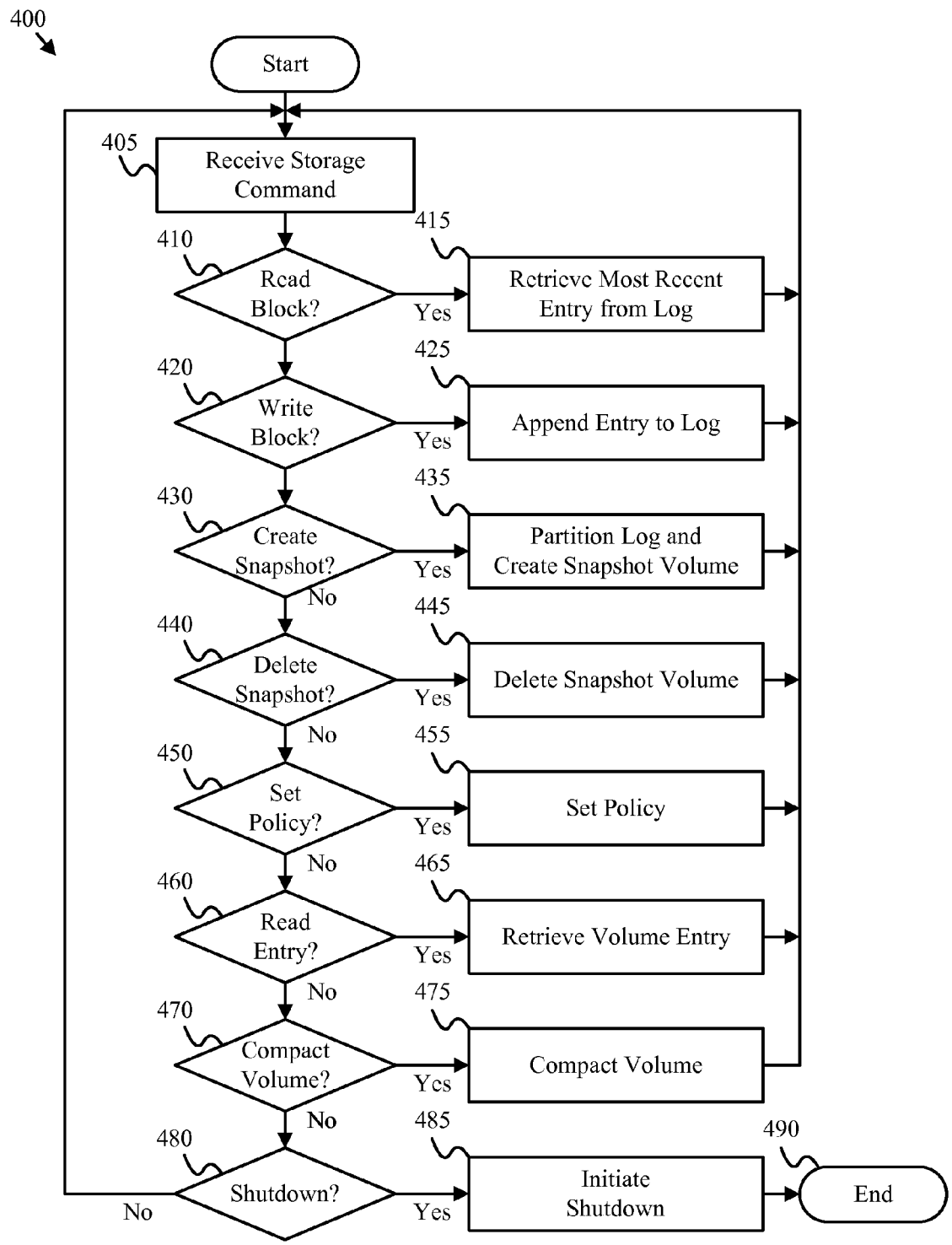
FIG. 4 is a flow chart diagram illustrating one embodiment of an incremental storage management method of the present invention.

FIG. 4 is a flow chart illustrating one embodiment of an incremental storage management method 400 of the present invention. The incremental storage management method 400 may be conducted in conjunction with, or independent of, the incremental storage appliance 300, the storage controller 220 (specifically the storage management module 222), or the like. The incremental storage management method 400 facilitates conducting snapshot management, remote copy, data compaction, policy management, and other operations associated with data storage devices and systems.

As depicted, the incremental storage management method 400 comprises a command loop that includes a receive command step 405, a series of tests 410-480, and a corresponding set of routines 415-485. The depicted series of tests include a read block test 410, a write block test 420, a create snapshot test 430, a delete snapshot test 440, a set policy test 450, a read entry test 460, a compact volume test 470 and a shutdown test 480. The commands executed by the incremental storage management method 400 may be sent by an application, utility, or the like, executing on a host such as the host 210 depicted in FIG. 2. In response to reception of a command at step 405, the depicted tests are conducted to ascertain the corresponding routine to be conducted by the incremental storage management method 400.

The corresponding set of routines include a retrieve block routine 415, an append entry routine 425, a partition log routine 435, a delete volume routine 445, a set policy routine 455, a retrieve entry routine 465, a compact volume routine 475, and an initiate shutdown routine 485. Although depicted as a command loop, other execution structures familiar to those of skill in the art, such as an index-driven interrupt table or a code object, may be employed to embody the incremental storage management method 400.

The retrieve block routine 415 retrieves a data block corresponding to a specified block address. Optionally, a specific volume may be specified. In one embodiment, the data block retrieved is the most recent entry within either the baseline partition or an incremental partition that is older than the specified volume.

The append entry routine 425 appends a log entry such as a data block corresponding to a write operation to the incremental log. In one embodiment, an index table containing the location of the most recent version of each data block is updated to reflect the new entry within the incremental log.

The partition log routine 435 partitions the incremental log and may automatically associate a volume identifier with the newly formed partition. The depicted partition log routine 435 may be conducted in response to reception of a 'create snapshot' command, or the like. In certain embodiments, the value of the volume identifier (such as a LUN) that is associated with the newly formed partition is controlled by policies set by a client application, system utility, system administrator, or the like. For example, depending on the selected policy, the volume identifier of the newly formed partition may be a system defined constant, a sequential value, an explicitly specified value such as a parameter associated with the 'create snapshot' command, or the like.

The delete volume routine 445 disassociates a volume identifier with a partition. The delete volume routine 445 may also initiate compaction of an incremental partition into the partition corresponding to the baseline volume. In one embodiment, a storage management policy may direct the delete volume routine 445 to place the released volume identifier into an available pool.

The set policy routine 455 assigns a specified storage management policy to an explicitly or implicitly specified resource. The specified resource is then managed according to the specified policy. In one embodiment, the set policy routine essentially assigns specific values to various system options and control parameters in order to effect the specified policy. Examples of system options directed by policy assignments include options for automatic compaction of volumes, options for assigning volume identifiers, and options for data redundancy.

The retrieve entry routine 465 retrieves an entry from a partition or volume in response to a read entry command or the like. In one embodiment, entries are sequentially accessed in time order. The retrieve entry routine is particularly useful when conducting recovery or other snapshot management operations. For example, the retrieve entry routine may be used to assemble an image of a volume corresponding to a specified time by sequentially accessing the incremental log up to the specified time.

The compact volume routine 475 compacts a specified volume. In one embodiment, the volumes may be compacted in place using the method illustrated in FIG. 6 or directed to a specific target such as the baseline volume. Other compaction strategies and methods known to those of skill in the art may be deployed by the compact volume routine 475.

The initiate shutdown routine 485 is used to shutdown the incremental storage management method 400 and associated hardware. Upon completion of the shutdown routine 485, the incremental storage management method 400 ends 490.

The collection of routines provided by the incremental storage management method 400 facilitates managing incremental storage in a manner that facilitates automated snapshot management, remote copy operations, policy management, and the like.

FIG. 5 is a text-based diagram depicting one example of an incremental storage interface 500 of the present invention. In one embodiment, the functions depicted in FIG. 5 correspond directly to the routines of the incremental storage management method 400 described in conjunction with FIG. 4. In one embodiment, the incremental storage interface 500 is supported by the storage management module 222.

The incremental storage interface 500 facilitates invoking corresponding routines (via messaging, code marshaling, or the like) contained within modules of the incremental storage appliance 300, the storage controller 220, or the like. The corresponding routines may be invoked by an operating system, a utility, an application, or the like residing on a host. Additionally, the incremental storage interface 500 may be invoked by modules resident or co-resident on a device or system such as the various modules depicted in FIGS. 1-4.

As depicted, the incremental storage interface 500 includes a set policy function 510, a read block function 520, a write block function 530, a create snapshot function 540, a delete snapshot function 550, a read snapshot entry function 560, and a compact volume function 570. In one embodiment, the functions 510-570 correspond directly to the routines 415-475 described in conjunction with FIG. 4.

Figure 6:
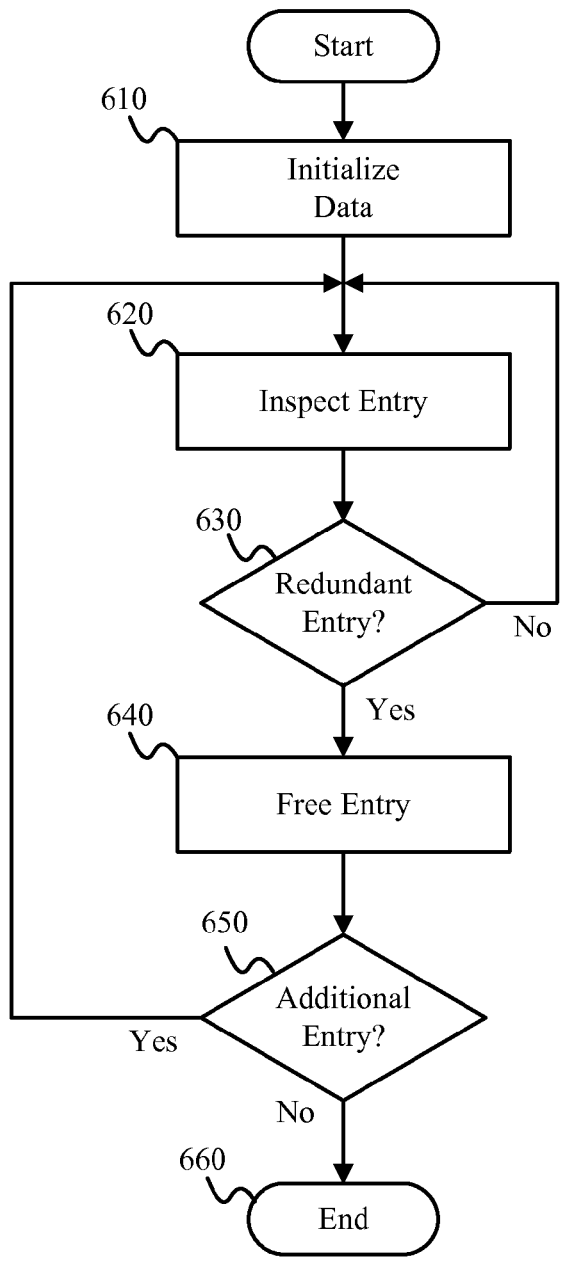
FIG. 6 is a flow chart diagram illustrating one embodiment of an in-place compaction method of the present invention.

FIG. 6 is a flow chart diagram illustrating one embodiment of an in-place compaction method 600 of the present invention. The in-place compaction method 600 may be conducted in conjunction with, or independent of the compaction module 320, the compact volume routine 475, or the compact volume function 570. As depicted, the in-place compaction method 600 includes an initialize data step 610, an inspect entry step 620, a redundant entry test 630, a free entry step 640, and an additional entry test 650. The in-place compaction method 600 facilitates compaction of a snapshot partition, or the like, without moving entries within an incremental log.

The initialize data step 610 initializes data related to conducting in-place compaction. In one embodiment, the initialize data step 610 initializes a free list used to record the entries that may be reused, and a block encountered table used to track which blocks have been encountered within a snapshot partition.

The inspect entry step 620, inspects an entry within a snapshot partition. In certain embodiments, the incremental log entries are inspected in reverse order (of occurrence) beginning with the most recent entry. In one embodiment, inspecting includes retrieving a logical block identifier associated with the entry.

The redundant entry test 630 ascertains whether an incremental log entry is redundant and therefore available for reuse. In one embodiment, the redundant entry test 630 includes a test and set operation that accesses a bit corresponding to the logical block identifier within a block encountered table (not shown.) In the aforementioned embodiment, the test operation ascertains whether the block was previously encountered and the set operation indicates (for subsequent tests) that the block has been encountered.

If the redundant entry test 630 ascertains that the block has not been encountered, the method loops to the inspect entry step 620. If the block has been encountered (i.e. is overwritten and therefore redundant), the method proceeds to the free entry step 640. The free entry step 640 frees an incremental log entry for subsequent reuse. In one embodiment, the free entry step 640 adds the entry to a free list.

Subsequent to completion of the free entry step 640, the in-place compaction method 600 proceeds to the additional entry test 650. The additional entry test 650 ascertains whether additional entries remain within the partitioned being processed. If additional entries remain, the method loops to the inspect entry step 620. If no additional entries remain, the method ends 660.

The present invention eases and improves storage management, particularly management of incremental images within a storage system. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for incremental data storage, the apparatus comprising:
    a baseline partition containing a baseline image;
    an incremental log configured to store data, the incremental log comprising at least one snapshot partition;
    a partition module configured to automatically partition the incremental log into an additional snapshot partition in response to a snapshot operation; and
    a compaction module configured to compact a snapshot partition, wherein the compaction module is further configured to conduct compaction as directed by a storage management policy, wherein the storage management policy is selected from the group consisting of a temporal-based policy, a status-based policy, and an event-based policy.

2. The apparatus of claim 1, wherein the partition module is further configured to assign a volume identifier to a newly formed partition as directed by a storage management policy.

3. The apparatus of claim 1, wherein the compaction module is further configured to conduct in-place compaction.

4. The apparatus of claim 1, wherein the compaction module is further configured to automatically compact a snapshot partition to a baseline volume.

5. The apparatus of claim 1, further comprising a copy module configured to copy selected log entries to a tertiary volume.

6. The apparatus of claim 1, further comprising a read module configured to retrieve a most recent data set corresponding to a block address.

7. The apparatus of claim 6, wherein the read module is further configured to retrieve the most recent data corresponding to a specified snapshot volume and block address.

8. An interface stored on computer readable medium for managing incremental data storage, the interface comprising:
- a write function configured to append an entry to an incremental log by way of a processer;
- a read function configured to retrieve a most recent log entry corresponding to a block address;
- a snapshot function configured to automatically partition the incremental log into a first and a second volume; and
- a delete volume function configured to release a snapshot volume;
- the delete volume function disassociating a volume identifier from the snapshot volume.

9. The interface of claim 8, further comprising a read next entry function configured to retrieve a sequential entry from the incremental log.

10. The interface of claim 8, further comprising a compact volume function configured to compact a snapshot volume.

11. A method for managing incremental data storage, the method comprising:
- appending data to an incremental log by way of a processor;
- automatically partitioning the incremental log in response to a snapshot operation;
- automatically assigning a volume identifier to a newly formed partition; and
- releasing a snapshot volume by disassociating a volume identifier from the snapshot volume.

12. The method of claim 11, wherein automatically assigning a volume identifier to a newly formed partition occurs as directed by a storage management policy.

13. The method of claim 11, further comprising conducting in-place compaction of a snapshot partition.

14. The method of claim 11, further comprising automatically compacting a snapshot partition.

15. A system for redundant incremental data storage, the system comprising:
- a primary storage device configured to store data;
- a secondary storage device configured to store data within a baseline volume and an incremental log comprising at least one snapshot partition that corresponds to a snapshot volume;
- a controller configured to store and access data on the primary and secondary storage device;
- a snapshot management module configured to automatically partition the incremental log into an additional snapshot partition and associate the additional snapshot partition with a volume identifier in response to a snapshot operation; and
- a compaction module configured to compact a snapshot partition, wherein the compaction module is further configured to conduct compaction as directed by a storage management policy, wherein the storage management policy is selected from the group consisting of a temporal-based policy, a status-based policy, and an event-based policy.

16. The system of claim 15, wherein the snapshot management module is further configured to automatically compact a snapshot volume into the baseline volume in response to the snapshot operation.

17. The system of claim 15, wherein the snapshot management module is further configured to conduct in-place compaction of a snapshot partition.

18. The system of claim 15, wherein the primary storage device comprises a plurality of redundantly arranged storage devices.

19. A computer readable medium for managing incremental data storage, the computer readable medium comprising program code configured to conduct a process comprising:
- append data to an incremental log;
- automatically partition the incremental log in response to a snapshot operation; and
- automatically assign a volume identifier to a newly formed partition; and
- releasing a snapshot volume by disassociating a volume identifier from the snapshot volume.

20. The computer readable medium of claim 19, wherein the process further comprises conducting in-place compaction of a snapshot partition.

21. The computer readable medium of claim 19, wherein the process further comprises automatically assigning a volume identifier to a newly formed partition occurs as directed by a storage management policy.

22. The computer readable medium of claim 19, wherein the process further comprises automatically compacting a snapshot partition.

* * * * *